United States Patent [19]

Takagi et al.

[11] 4,282,841
[45] Aug. 11, 1981

[54] IGNITION TIMING CONTROL SYSTEM FOR AN INTERNAL COMBUSTION ENGINE

[75] Inventors: Yasuo Takagi; Michio Onoda; Masaaki Katsumata, all of Yokohama; Kenji Yoneda, Fujisawa, all of Japan

[73] Assignee: Nissan Motor Company, Limited, Japan

[21] Appl. No.: 34,286

[22] Filed: Apr. 30, 1979

[30] Foreign Application Priority Data

Jun. 27, 1978 [JP] Japan .................................. 53-77858
Jun. 27, 1978 [JP] Japan .................................. 53-77859

[51] Int. Cl.³ ............................................. F02P 5/04
[52] U.S. Cl. .................................... 123/425; 123/427
[58] Field of Search ......... 123/117 R, 148 E, 146 JA, 123/139 AW, 140 MC, 119 A; 13/35

[56] References Cited

U.S. PATENT DOCUMENTS

| 4,061,116 | 12/1977 | Saida et al. | 123/117 D |
| 4,063,538 | 12/1977 | Powell et al. | 123/425 |
| 4,116,173 | 9/1978 | McDougal et al. | 123/119 ED |
| 4,131,097 | 12/1978 | Sawada et al. | 123/148 C |
| 4,153,019 | 5/1979 | Laubenstein et al. | 123/117 D |

FOREIGN PATENT DOCUMENTS

2412487 of 0000 Fed. Rep. of Germany.
2616095 of 0000 Fed. Rep. of Germany.
2659561 of 0000 Fed. Rep. of Germany.

Primary Examiner—Charles J. Myhre
Assistant Examiner—R. A. Nelli
Attorney, Agent, or Firm—Lane, Aitken, Ziems, Kice & Kananen

[57] ABSTRACT

An ignition timing control system for an internal combustion engine comprises first circuitry for producing a function of the intensity of combustion knock in each cylinder in a sequence, second circuitry for storing the function of each cylinder respectively in a memory circuit each of which corresponds to a specific cylinder, and third circuitry for determining the ignition timing of each cylinder by modifying the basic ignition timing determined by an advance mechanism, in accordance with the respectively stored functions.

15 Claims, 10 Drawing Figures

IGNITION TIMING CONTROL SYSTEM FOR AN INTERNAL COMBUSTION ENGINE

FIELD OF THE INVENTION

This invention generally relates to an ignition timing control system for an internal combustion engine. More particularly, the present invention relates to such a control system for an internal combustion engine with a plurality of cylinders, which system controls the ignition timing in accordance with the intensity of combustion knock.

BACKGROUND OF THE INVENTION

In some conventional ignition timing control systems for an internal combustion engine, the ignition timing is so controlled that a trace (low level) combustion knock occurs in the combustion chambers. It is well known that continued engine operation under high intensity of combustion knock (detonation) is undesirable since it results in physical damage to the engine and in loss of power. However, especially in a low speed operating range, it is advantageous that trace knock continuously occurs for the engine output, and the fuel consumption characteristic. Since the ignition timing influences the tendency of occurrence of combustion knock, the ignition timing is controlled (advanced or retarded) to maintain such trace combustion knock in the internal combustion engine. In the above described conventional ignition timing control system, the ignition timng is determined equally or uniformly throughout all of the cylinders of an internal combustion engine without analysis of the variation of the intensity of combustion knock in each cylinder. However, the optimal ignition timing for each cylinder is usually different from one another since the tendency of occurrence of combustion knock in each cylinder is different from each other due to various reasons such as an irregular distribution of an air/fuel mixture. Therefore, when the ignition timings of all cylinders are determined, either combustion knock takes place mainly in some specific cylinders due to an excessively advanced angle of the ignition timing or no combustion knock occurs at all in some specific cylinders due to an excessively retarded angle of the ignition timing. This means that optimal ignition timings for respective cylinders are not obtained in such a conventional control system and therefore, the engine output and fuel consumption characteristic get worse when the conventional ignition timing control system is employed.

SUMMARY OF THE INVENTION

The present invention has been developed in order to remove the above mentioned disadvantages and drawbacks of the conventional ignition timing control systems.

It is, therefore, a primary object of the present invention to provide an ignition timing control system for an internal combustion engine, in which the ignition timing for each cylinder is controlled respectively in accordance with the detected intensity of combustion knock in each cylinder.

Another object of the present invention is to provide such a control system in which the ignition timing for each cylinder is made optimal.

A further object of the present invention is to provide such a control system in which the engine output is increased.

A still further object of the present invention is to provide such a system in which the fuel consumption characteristic is improved.

BRIEF DESCRIPTION OF THE DRAWINGS

These and other objects and features of the present invention will become more readily apparent from the following detailed description of the preferred embodiments taken in conjunction with the accompanying drawings in which.

DETAILED DESCRIPTION OF THE PREFERRED EMBODIMENTS

Figure 1A:
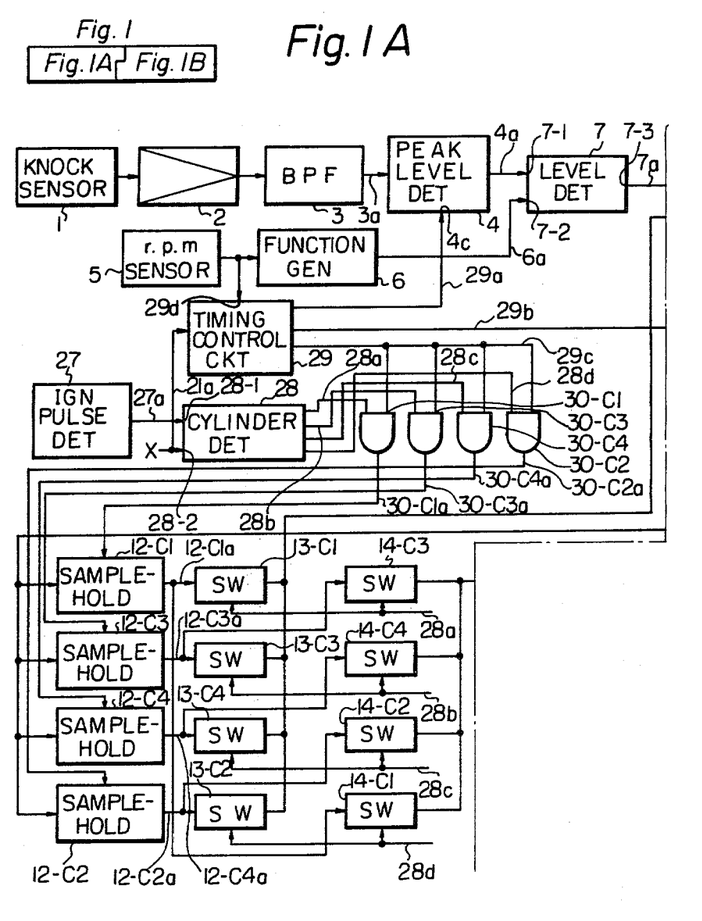
FIGS. 1A and 1B show a schematic block diagram form of a first preferred embodiment of the ignition timing control system according to the present invention.
Figure 1B:
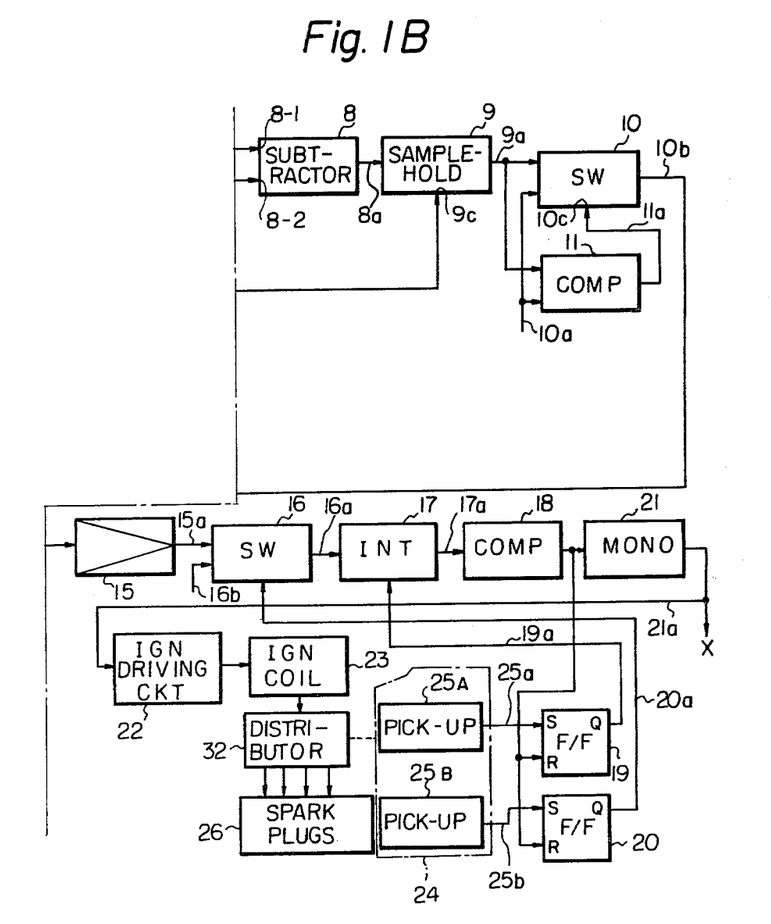
Figure 3:
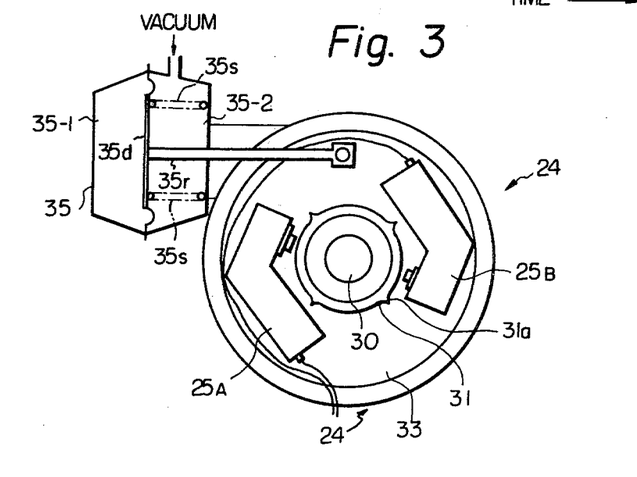
FIG. 3 shows a mechanical advance mechanism installed in the casing of a distributor utilized in the ignition timing control system according to the present invention.

Referring to FIG. 1, a schematic block diagram of a first embodiment of the ignition timing control system for an internal combustion engine according to the present invention is shown. The system includes a distributor 32 a portion of which is shown in FIG. 3. As illustrated in FIG. 3 the distributor 32 includes a mechanical advance mechanism 24 which consists of a conventional centrifugal advance mechanism (not shown) and also a conventional vacuum controlled mechanism. The advance mechanism 24 comprises a rotary shaft 30 which is an extension of the shaft of the distributor 32 and is arranged to rotate in synchronization with the rotation of the engine crankshaft (not shown). A rotor 31 is fixedly attached to the rotary shaft 30 to rotate with the same. The rotor 31 has four projections 31a along the periphery thereof. The projections 31a are arranged with an equal circular pitch, i.e. 90 degrees. Two electro-magnetic pick-ups 25A and 25B are disposed on a disk 33 which is arranged to rotate independently from the shaft 30 and the rotor 31. A rod 35r is pivotally connected to the disk 33 at one end thereof, while the other end of the rod 35r is fixedly connected to a diaghragm assembly 35. The diaphragm assembly 35 has a first chamber 35-1 communicated with the atmosphere and a second chamber 35-2 communicated with the intake manifold (not shown) of the engine to induce the vacuum therein. When the vacuum increases, the diaphragm 35d is biased toward the left, in the illustrated example, against the biasing force of springs 35s. Accordingly, the disk 33 is slightly rotated via the rod 35r clockwise so that the relative positions of the pick-ups 25A and 25B with respect to the rotor 33 change. With this arrangement, the phase between the pick-ups 25A and 25B and the rotor 31 are changed in accordance with the magnitude of the vacuum prevailing in the intake manifold.

Figure 2:
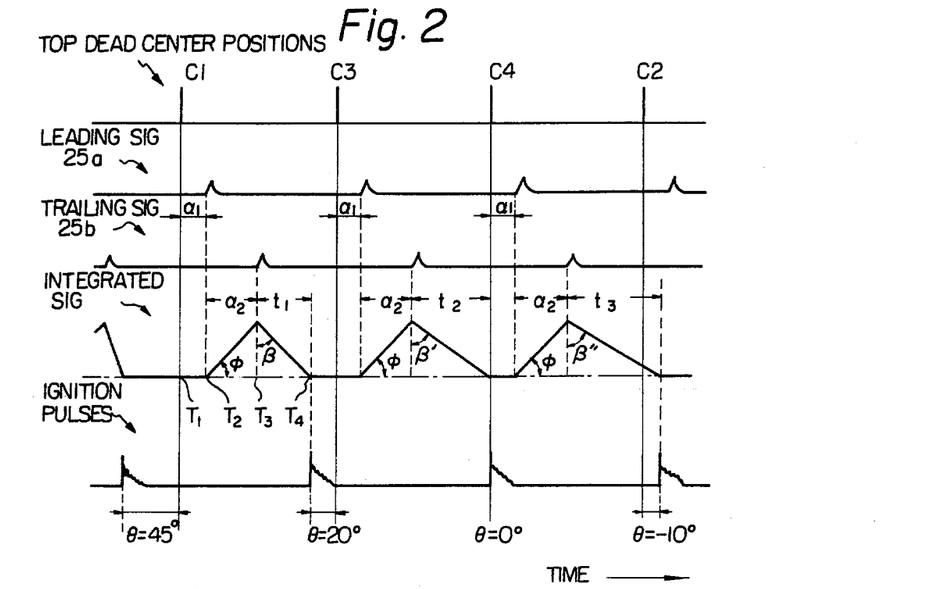
FIG. 2 shows a first time chart for the brief explanation of the operation of the ignition timing control system according to the present invention.

As the crankshaft of the engine rotates, the rotor 31 rotates so that pulse signals are respectively induced in the first and second pick-ups 25A and 25B each time the projections 31a pass adjacent to the pick-ups 25A and 25B. When a specific projection 31a which corresponds to a specific cylinder of the engine passes adjacent to the first pick-up 25A, a signal, which will be referred to as a leading signal 25a, is induced in the winding of the first pick-up 25A. As shown in FIG. 2, the leading signal 25a is arranged to be transmitted with an interval $\alpha_1$ corresponding to a rotational angle of the crankshaft from a point of the top dead center of the piston movement of each cylinder. This predetermined angle is variable in accordance with the engine rotational speed and the magnitude of the vacuum since the pick-ups 25A and 25B change their relative positions as described hereinabove. With a given amount of time delay $\alpha_2$ defined by the engine speed the same projection 31a passes adjacent to the second pick-up 25B and a signal which will be referred to as a trailing signal 25b, is induced in the winding of the second pick-up 25B. The number of the projections 31 is four since the illustrated embodiment is designed to be applied to a four-cylinder engine and therefore, each of the first and second pick-ups 25A and 25B produces four pulses per a single revolution of the rotor 31.

Prior to the detailed explanations of the construction and operation of the ignition timing control system shown in FIG. 1, a brief description of the function of the system will be made for the sake of understanding the general idea of the present invention in connection with FIG. 1 and FIG. 2 which shows a time chart of important signals.

As mentioned hereinbefore, the engine has four cylinders C1, C2, C3 and C4 and it is assumed that the firing order of the cylinders is as C1, C3, C4 and C2. The ignition timing of the ignition pulses applied to a series of spark plugs 26 is determined basically by the mechanical advance mechanism 24, shown in FIG. 3, which mechanism is installed in the casing of the distributor 32. As described hereinbefore, the timing, basically determined by the mechanical advance mechanism 24, includes the vacuum advance and the centrifugal advance and this timing is referred to hereinafter as a basic ignition timing. The leading signal 25a produced by the first pick-up 25A is applied to a set terminal of a first flip-flop 19 so that the first flip-flop 19 produces a high level signal with which an integrator 17 starts functioning. At this time the output of a second flip-flop 20 assumes a low level and therefore, a predetermined voltage signal 16b is applied via a switching circuit 16 to the input of the integrator 17. Accordingly, the integrator 17 integrates the predetermined voltage, which is of positive polarity, from time $T_2$ which is defined by the above mentioned interval $\alpha_1$, from a point, i.e. time $T_1$, corresponding to the top dead center of a specific cylinder. At time $T_3$ a trailing signal 25b is produced by the second pick-up 25B to trigger a second flip-flop 20. A high level signal is developed at the output Q of the second flip-flop 20 to control the switching circuit 16. Upon presence of the high level signal from the second flip-flop 20, the switching circuit 16 transmits a negative voltage signal 15a, which is produced by an amplifier 15, to the input of the integrator 17. The integrator 17 starts integrating the negative voltage 15a from time $T_3$. The output voltage of the integrator 17 thus decreases as shown, approaching zero level. The output of the integrator 17 is connected to an input of a comparator 18 which produces an output signal when the voltage of the input signal equals zero. Namely, the comparator 18 produces an output signal at time $T_4$ to trigger a monostable multivibrator 21. The monostable multivibrator 21 produces a pulse signal at time $T_4$ which is applied to the ignition driving circuit 22. In receipt of the pulse signal from the monostable multivibrator 21, the ignition driving circuit 22 transmits electric power from a power supply such as a battery to the primary winding of the ignition coil so that a high voltage is induced across the secondary winding of the same. The high voltage is applied via the distributor 32 to a specific one of the series of spark plugs 26. A conventional breaker point mechanism is not employed since the primary winding of the ignition coil 23 is energized via the above mentioned ignition driving circuit 22.

It will be understood from the time chart shown in FIG. 2, that the ignition timing is determined by the slope $\beta$ of the integration of the negative voltage 15a. Although the positive voltage 16b is constant and therefore the slope $\phi$ of integration between time $T_2$ and time $T_3$ is constant all the time, the negative voltage 15a is variable so that the slope $\beta$ of integration such as between time $T_3$ and time $T_4$ changes as shown and indicated by references $\beta'$ and $\beta''$. In other words, when the engine rotates at a given speed, the duration $\alpha_2$ between time $T_2$ and time $T_3$ is constant, while the duration $t_1$ between time $T_3$ and time $T_4$ for each ignition pulse varies in proportion to the slope $\beta$ of the integration of the negative voltage 15a as indicated by $t_2$ and $t_3$. Since the ignition spark occurs when the integrated voltage equals zero, the ignition timing expressed in terms of angle $\theta$ with respect to the top dead center varies as shown for example from 45 degrees to $-10$ degrees.

It will be understood that in order to change the ignition timing, the value of the negative voltage 15a must be controlled to obtain the most suitable or optimum ignition timing. It will be described hereinbelow how to produce and control the above mentioned negative voltage 15a in connection with the remaining portion of FIG. 1 and a detailed time chart separately illustrated in FIGS. 4A, 4B and 4C.

A combustion knock sensor 1, which will be simply referred to as a knock sensor hereinafter, is provided to sense the magnitude or intensity of combustion knock which may occur in the cylinders of an internal combustion engine (not shown). The knock sensor 1 may be a vibration sensor (pick-up) or a acoustic sensor (pick-up) and is arranged to produce an output signal indicative of the intensity of the combustion knock. The output of the knock sensor 1 is connected to an input of an amplifier 2 so that the signal from the knock sensor 1 is amplified to a desired extent. The output of the amplifier 2 is connected to an input of a band-pass filter (BPF) 3 so that frequencies other than combustion knock are eliminated. In other words, components whose frequencies are of combustion knock are transmitted. The output of the band-pass filter 3 is connected to an input of a peak level detector 4 the output of which is connected to a first input of a level detector 7. The peak level detector 4 has a control terminal 4c to which a gate signal 29a is applied. The gate signal 29c is produced in a timing control circuit 29 which will be discussed hereinlater, in synchronization with the ignition timing. The gate signal 29a assumes a high level for a predetermined period of time after the presence of a pulse signal 21a from the monostable multivibrator 21. The peak level detector 4a is arranged to detect the peak level of the input signal applied from the band-pass filter 3 only when the gate signal 29a assumes a low level, while the datum of the peak level detector is reset to zero in receipt of a high level gate signal 29a.

An engine rpm (rotational speed of the crankshaft) sensor 5 may be a conventional tachometer generator and is arranged to produce an output signal the magnitude of which is indicative of the rotational speed of the crankshaft of the engine. The output of the engine rpm sensor 5 is connected to an input of a function generator 6 which produces an output signal 6a in accordance with the engine rpm.

Figure 5:
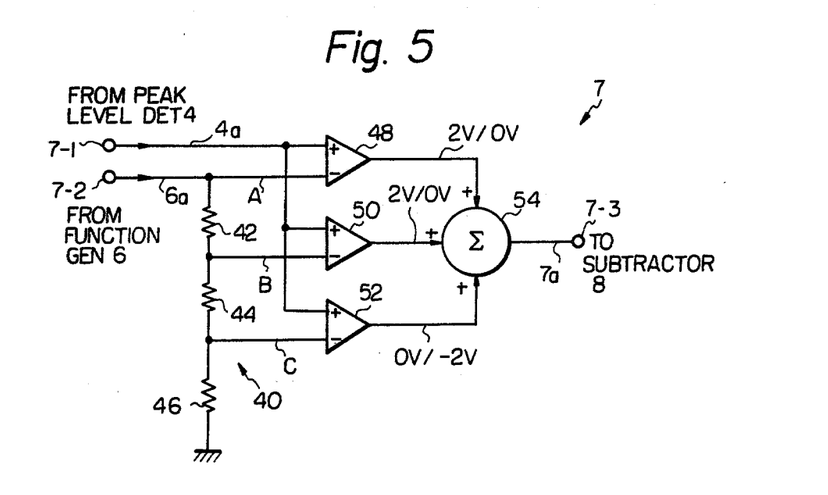
FIG. 5 shows a detailed circuit diagram of the level detector shown in FIG. 1.

Reference is now made to FIG. 5 which shows a detailed circuit diagram of the level detector 7 shown in FIG. 1. The level detector 7 has first and second input terminals 7-1 and 7-2 respectively connected to the outputs of the peak level detector 4 and the function generator 6 shown in FIG. 1. The first input terminal 7-1 is connected to noninverting inputs (+) of three comparators 48, 50 and 52, while the second input terminal 7-2 is connected to an inverting input (−) of the first comparator 48. A voltage divider 40 including three resistors 42, 44 and 46 is interposed between the second input terminal 7-2 and ground. A first junction between the first and second resistors 42 and 44 is connected to an inverting input (−) of the second comparator 44, while a second junction between the second and third resistors 44 and 46 is connected to an inverting input (−) of the third comparator 52. The outputs of the three comparators 42, 44 and 46 are respectively connected to inputs of an adder 54 whose output is connected to an output terminal 7-3 of the level detector 7.

Figure 6:
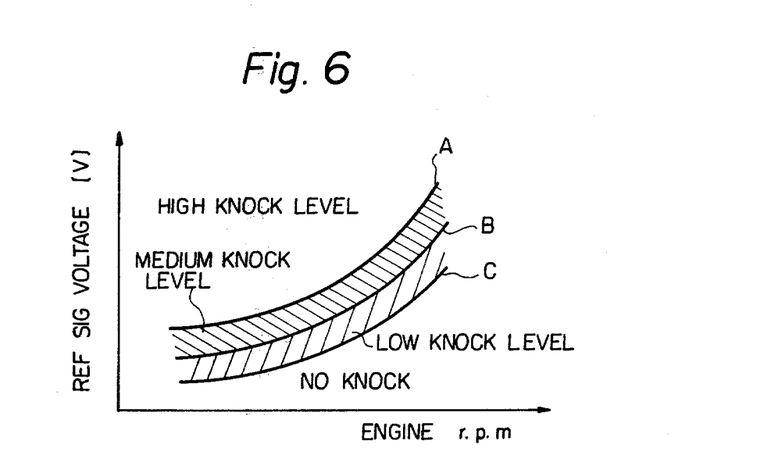
FIG. 6 shows a graphical representation of the relationship between the engine rpm and the voltages of reference signals indicated in FIG. 5.

In this embodiment the voltage of the signal 6a from the function generator 6 is directly applied to the first comparator as a first reference voltage A and other reference voltages B and C for the second and third comparators 44 and 46 are respectively produced by dividing the first reference voltage A. It will be easily understood that the first reference voltage A is greater than the second reference voltage B, and the second reference voltage B is greater than the third reference voltage C. These reference voltages A, B and C, however, vary as functions of engine speed as shown in FIG. 6, since the voltage of the signal 6a produced by the function generator 6 varies as a function of engine speed as described hereinabove. The first and second comparators 48 and 50 produce output signals of a predetermined high level voltage such as 2 volts, when the voltage of the signal 4a from the peak level detector 4 exceeds the respective reference voltages A and B, while these first and second comparators 48 and 50 produce output signals of low level such as 0 volt, when the above condition is not fulfilled. In the same manner, the third comparator 52 produces an output signal of a predetermined high level voltage such as 0 volt when the voltage of the signal 4a exceeds the reference voltage C, while the third comparator 52 produces an output signal of of low level, such as −2 volts when the voltage of the signal 4a is below that of the signal 6a. It will be understood that if the voltage of the signal 4a is above the first reference voltage A, the adder 54 produces an output signal of 4 volts; if the voltage of the signal 4a is above the second reference voltage B but below the first reference voltage A, the adder 54 produces an output signal of 2 volts; if the voltage of the signal 4a is above the third reference voltage C but below the second reference voltage B, the adder 54 produces an output signal of 0 volt; and if the voltage of the signal 4a is below the third reference voltage C, the adder 54 produces an output signal of −2 volts. With this operation, the level of the signal 4a derived from the peak level detector 4 is classified into four ranges defined by the three reference voltages A, B and C. Since these classified ranges respectively correspond to the intensity or level of combustion knock, these ranges will be referred to as high knock level, a medium knock level, a low knock level and a no knock level as shown in FIG. 6.

The purpose of the variation in voltages of the reference voltages A, B and C in accordance with the engine rotational speed, is to eliminate the influence of background noise. When the engine rotates at high speed, the background noise in sound and/or vibrations increases although the intensity of the combustion knock per se does not increase. However, the intensity of the combustion knock which is detected as a function of sound or vibrations seems to be increased, when the background noise level increases, due to principle of superposition. Therefore the levels of the reference voltages with which the intensity of combustion knock is detected and classified has to be changed as a function of the engine rotational speed in order to detect correctly and accurately the intensity of each combustion knock.

The output of the level detector 7, i.e. the output of the adder 54, is connected to a first input 8-1 of a subtractor 8 shown in FIG. 1. The subtractor 8 has a second input 8-2 to receive a signal indicative of the intensity of the combustion knock in the previous cycle, i.e. the combustion knock one cycle before from one of switches 12-C1 to 13-C4. The operation of the switches 13-C1 to 13-C4 will be described hereinlater, but it is assumed here, that a signal indicative of the intensity of the preceeding combustion knock of a specific cylinder is applied from one of the switching circuits 13-C1 to 13-C4 to the second input 8-2 of the subtractor 8 when the first input 8-1 of the subtractor 8 receives the signal 7a which indicates the intensity of combustion knock of the present instant of the specific cylinder. Assuming that the knock sensor 1 detects the combustion knock of the first cylinder C1 of a multi-cylinder, such as a four-cylinder, engine and a signal 7a related to the intensity of the combustion knock is just applied to the subtractor 8, only the first switch 13-C1 is closed to transmit a signal 12-C1a from a sample-hold circuit 12-C1 to the subtractor 8. The switching circuits 13-C1 to 13-C4 as well as other series of switching circuits 14-C1 to 14-C4, the function of which will be discussed hereinlater, are controlled to be enabled, i.e. closed, by timing gate signals 28-a to 28-d produced in a cylinder detecting circuit 28 the construction and operation of which will be described later.

Figure 4A:
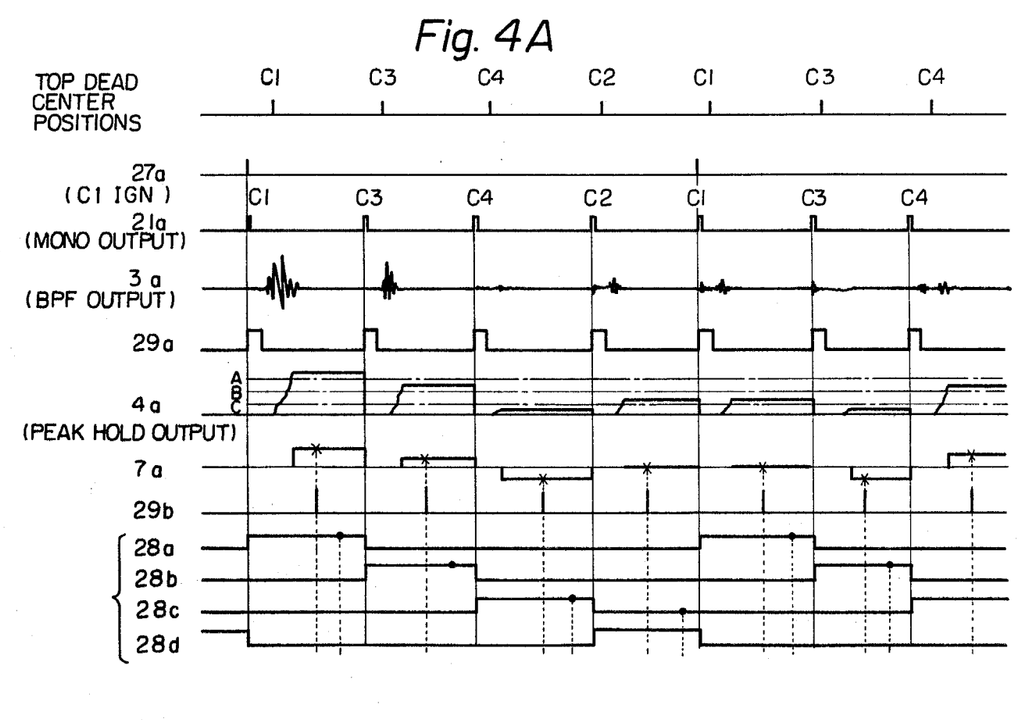
FIGS. 4A, 4B and 4C constitute a time chart showing various waveforms of signals obtained in the ignition timing control system shown in FIG. 1.

Upon receiving two signals 7a and 12-C1a at the inputs, the subtractor 8 produces an output signal 8a the magnitude of which indicates the difference between the voltages of the input signals 7a and 12-C1a. The output of the subtractor 8 is connected to an input of a sample-hold circuit 9 which has a control terminal 9c connected to a second output terminal of the timing control circuit 29 to receive a timing signal 29b. The timing signal 29b includes a pulse train the pulse duration of which is arranged to be varied as a function of the engine rotational speed. As shown in FIG. 4A, a single pulse is applied to the control terminal 9c of the sample-hold circuit 9 per each duration between ignition pulses. The time of the occurrence of the single pulse of the timing signal 29b is arranged to correspond to the duration for which the level detector 7 emits an output signal indicative of a function of the intensity of each combustion knock. Upon presence of the single pulse of the timing signal 29b, the sample-hold circuit 9 samples the magnitude of the output signal 8a of the subtractor 8 and holds (stores) the input signal until a following pulse is applied to the sample-hold circuit 9. The output of the sample-hold circuit 9 is connected to a first input of a switching circuit 10 and a first input of a comparator 11. The switching circuit 10 and the comparator 11 respectively have second inputs to receive a reference signal 10a. The output of the comparator 11 is connected to a control terminal 10c of the switching circuit 10 to provide the switching circuit 10 with a control (gate) signal 11a, while the output of the switching circuit 10 is connected to inputs of a series of sample-hold circuits 12-C1 to 12-C4. The combination of the switching circuit 10 and the comparator 11 functions as a limiter circuit as will be described hereinbelow.

The reference signal 10a is produced by a suitable voltage divider (not shown) so as to supply a predetermined voltage to the switching circuit 10 and the comparator 11. The comparator 11 is arranged to produce a high level output signal 11a only when the voltage of the signal 9a is greater than that of the other signal 10a, i.e. the reference signal. The switching circuit 10 is arranged to permit the transmission of the first input signal 9a when a low level control signal is applied to the control terminal 10c thereof and to permit the transmission of the second input signal 10a when a high level control signal is applied to the same. Therefore, the output signal 9a of the sample-hold circuit 9 is transmitted via the switching circuit 10 to the inputs of the series of sample-hold circuits 12-C1 to 12-C4 only when the voltage of the signal 9a is below the voltage of the reference signal 10a. On the contrary, when the voltage of the signal 9a is above the voltage of the reference signal 10a, the reference signal 10a per se is fed via the switching circuit 10 to the sample-hold circuits 12-C1 to 12-C4. The above described function of the limiter circuit which is constituted by the switching circuit 10 and the comparator 11 will be readily understood by means of the waveform diagram shown in the time chart of FIG. 4B.

Here, it is to be noted that the voltage of the reference signal 10a, which is produced by a suitable voltage divider as described hereinabove, wherein the voltage is constant, is selected to correspond to an advance angle which will be hereinafter referred to as the most advanced ignition timing. This most advanced ignition timing has a predetermined relationship with respect to the previously mentioned basic ignition timing determined by the mechanical advance mechanism 24. For instance, if the most advanced ignition timing for a specific engine rotational speed is to be determined at a predetermined point such as a point expressed by $\theta = 20°$ as shown in FIG. 2, the slope of the integration of the negative voltage has to be maintained over a predetermined value, such as is shown in FIG. 2 by applying a predetermined negative voltage to the integrator 17. Both of the input signals 9a and 10a of the switching circuit 10 are of positive voltages and therefore, a positive voltage is transmitted via the switching circuit 10, one of the sample-hold circuits 12-C1 to 12-C4 and one of switching circuits 14-C1 to 14-C4 to an input of the inverting amplifier 15 so that the positive voltage is inverted into a negative voltage and is simultaneously amplified to an extent. It will be understood, therefore, that the purpose of the provision of the limiting circuit, which consists of the switching circuit 10 and the comparator 11, is to place a limit upon the advance angle of the ignition timing so that the advance angle of the ignition timing is never advanced exceeding the limit, viz. the most advanced ignition timing (such as time $T_4$) determined by the voltage of the reference signal 10a with respect to the basic ignition timing (such as $T_2$ or $T_3$).

As described hereinbefore, the two series of switching circuits 13-C1 to 13-C4 and 14-C1 to 14-C4 are controlled by timing signals 28a, 28b, 28c and 28d, while the series of sample-hold circuits 12-C1 to 12-C4 are controlled by timing signals 30-C1a to 30-C4a respectively produced by a series of AND gates 30-C1 to 30-C4 which are responsive to the above mentioned timing signals 28a to 28d.

These timing signals 28a to 28d and 30-C1a to 30-C4a as well as another set of timing signals 29a to 29c are produced as follows. An ignition pulse detector 27 is arranged to detect the ignition pulses of a specific cylinder such as the first cylinder C1. The ignition pulse detector 27 comprises a comparator or a Schmitt trigger circuit which is arranged to produce a single pulse in response to a single ignition pulse applied from the distributor 32 to the first plug of the spark plugs 26. As shown in FIG. 4A, the ignition pulse detector 27 produces, therefore, a pulse signal 27a each time the first spark plug is energized just before the top dead center position of the first cylinder C1 and this pulse signal 27a is fed to a first input 28-1 of the before mentioned cylinder detector 28.

The cylinder detector 28 includes a conventional 4-bit shift register (not shown) and has first and second inputs 28-1 and 28-2 which respectively correspond to a data input of the shift register and a clock pulse input of the same. The second input 28-2 is connected to the output of the monostable multivibrator 21, where the connection therebetween is omitted and is implied by symbols X, to receive the output signal 21a of the monostable multivibrator 21. As described before, and shown in FIG. 4A, the monostable multivibrator 21 output signal 21a includes pulses which occur just before respective top dead center positions of the cylinders C1 to C4. The 4-bit shift register included in the cylinder detector 28 operates as a series-in/parallel-out shift register. In other words, each element, i.e. each flip-flop, of the shift register has an output to transmit the stored datum, where the outputs signals of the respective flip-flops are designated by references 28a, 28b, 28c and 28d. It will be understood that when pulses 27a and 21a are simultaneously applied to the respective data input and the clock pulse input, the state of the shift register becomes 1-0-0-0. When a following clock pulse is applied from the monostable multivibrator 21, the data stored in the shift register are shifted up so that the state of the shift register becomes 0-1-0-0. In this way, the stored pulse is shifted rightward each time a clock pulse is applied to the second input 28-2. Since the stored data are read out in parallel, when the state of the shift register is 1-0-0-0, only the output timing signal 28a assumes a high level, while the remaining timing signals 28b, 28c and 28d are of low level. With this provision, the timing signals 28a to 28d periodically assume high level in a sequence as shown in the time chart of FIG. 4A to indicate a specific cylinder in which combustion takes place. These timing signals 28a to 28d are supplied to first terminals of the AND gates 30-C1 to 30-C4 as well as to the control terminals of the two sets of switching circuits 13-C1 to 13-C4 and 14-C1 to 14-C4.

Apart from the cylinder detector 28, the construction and function of the timing control circuit 29 will be described. Although the timing control circuit 29 is shown being a single circuit, actually the timing control circuit 29 comprises three timing signal generating circuits such as monostable multivibrators. These monostable multivibrators are arranged to be triggered by the pulse signal 21a derived from the monostable multivibrator 21. The first monostable multivibrator included in the timing control circuit 29 produces an output pulse signal 29a of a predetermined pulse width. This pulse width is set by selecting the time constant of the first monostable multivibrator to correspond to the duration for which sound and/or vibrations, produced in each cylinder of the engine in connection with the initial portion of the combustion, lasts. Since during the initial time of each combustion of an air/fuel mixture in a cylinder no combustion knock, i.e. detonation, occurs, the peak level detector 4 is disabled for this initial period of time by the timing signal 29a, so that the peak level detector 4 detects only the degree of the combustion knock correctly.

The second and third monostable multivibrators included in the timing control circuit 29 respectively produce pulse signals when triggered by the input signal 21a. The pulse width of the pulses produced by the second and third monostable multivibrators are much longer than that of the pulse produced by the first monostable multivibrator, and the pulse of the third monostable multivibrator is longer than that of the second monostable multivibrator. Although the pulse width of the pulse produced by the first monostable multivibrator is predetermined and is constant, the pulse width of the pulses respectively produced by the second and third monostable multivibrators are not fixed and are arranged to change in accordance with the engine rotational speed. As shown in FIG. 1, the output of the rpm sensor 5 is connected to a control terminal 29d of the timing control circuit 29 to supply the signal indicative of the rotational speed of the engine to the above mentioned second and third monostable multivibrators. The time constant of each of the second and third monostable multivibrators is changed in accordance with the engine rpm to produce pulse signals the width of which is inversely shortened as the engine speed increases. The output pulses of the second and third monostable multivibrators are respectively fed to series circuits of a differentiator and a waveform shaping circuit, such as a Schmitt trigger circuit, so that the timing pulses 29b and 29c are obtained in response to the trailing edges of the output pulses of the second and third monostable multivibrators. The second timing signal 29b is fed to the sample-hold circuit 9 as described hereinbefore, while the third timing signal 29c is fed to the first inputs of the AND gates 30-C1 to 30-C4.

These AND gates 30-C1 to 30-C4 receive, at the second inputs thereof, the before mentioned four timing signals 28a to 28d. It will be seen that each of the AND gates 30-C1 to 30-C4 is enabled to transmit the third timing signal 29c by the signals 28a to 28d in a sequence. The outputs of the AND gates 30-C1 to 30-C4 are respectively connected to the control terminals of the sample-hold circuits 12-C1 to 12-C4 to control the sampling function of the sample-hold circuits 12-C1 to 12-C4 in the same sequence. As shown in the time chart of FIG. 4B, the voltage of the output signal 12-C1a of the first sample-hold circuit 12-C1 is changed to the voltage of the input signal, i.e. the output signal 10b of the switching circuit 10, when the voltage of the signal 10b differs from that of the signal presampled by the same sample-hold circuit 12-C1.

Figure 4B:
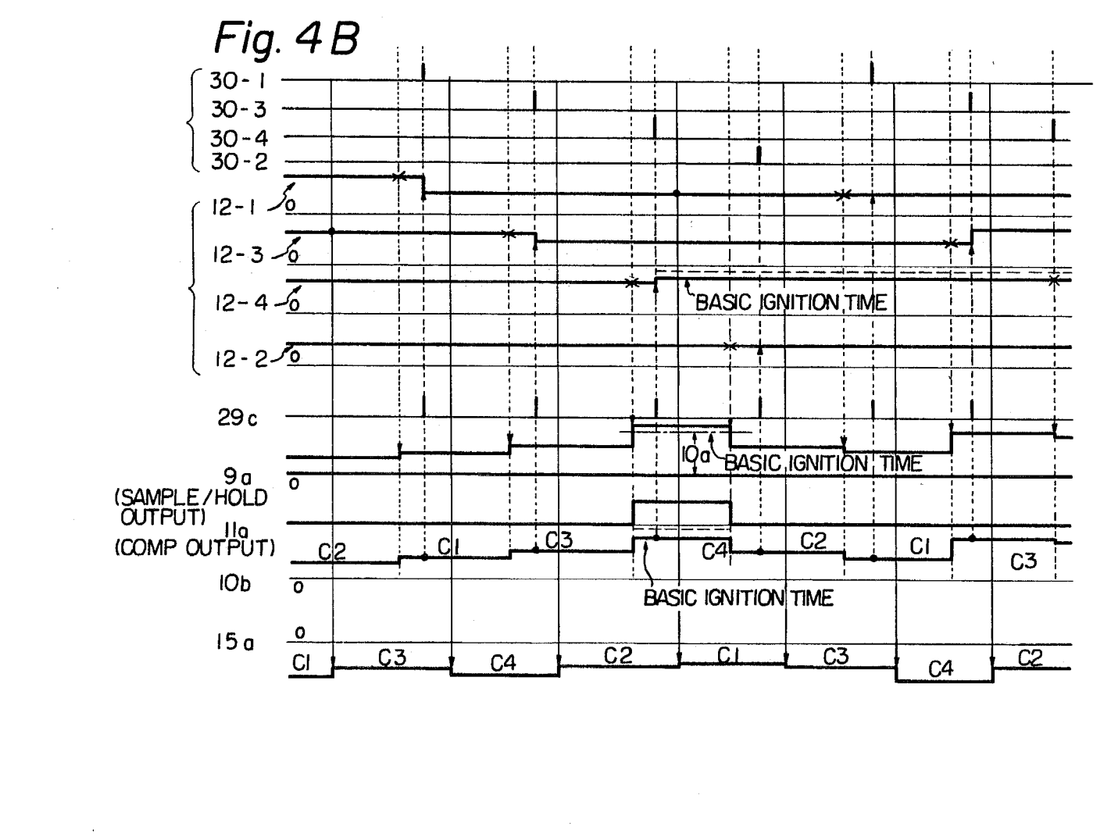
Figure 4C:
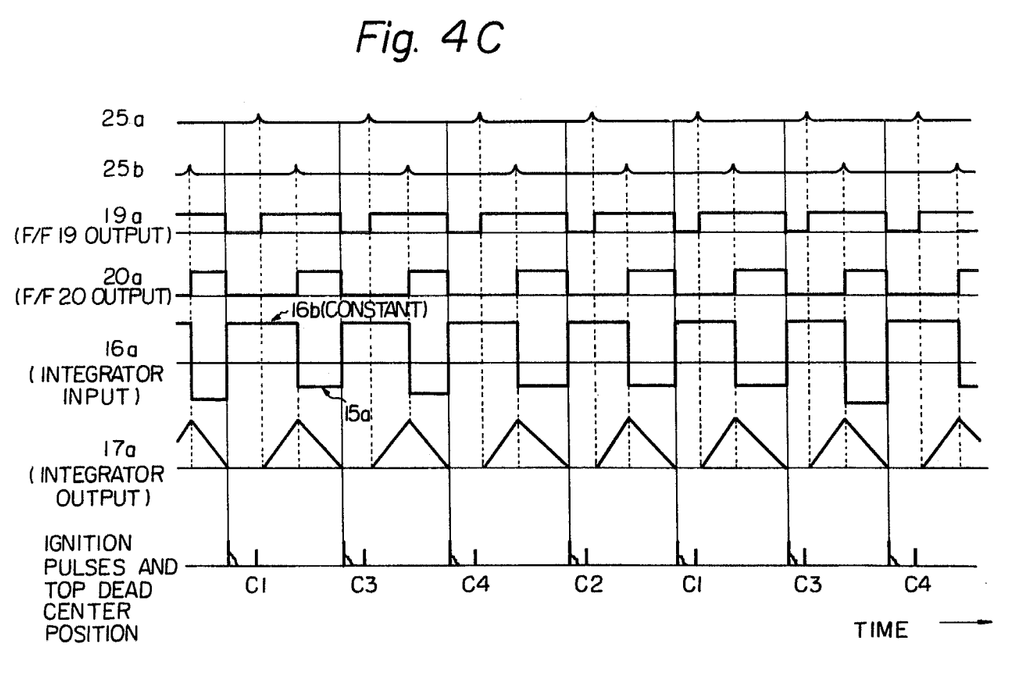

The output signal 12-C1a of the first sample-hold circuit 12-C1 is transmitted to an input of the first switching circuit 14-C1 which is controlled by the timing signal 28d. It is to be noted that the switching circuits 14-C3, 14-C4, 14-C2 and 14-C1 are respectively controlled by the timing signals 28a, 28b, 28c and 28d. This means that the information stored in the first sample-hold circuit 12-C1 is transmitted to the inverting amplifier via the first switching circuit 14-C1 with a time delay. In the same manner other information of the remaining sample-hold circuits 12-C2 to 12-C4 is transmitted in a sequence with the same time delay. It will be understood from the foregoing and the time chart of FIG. 4B, that each piece of information stored in each of the sample-hold circuits 12-C1 to 12-C4 is held as is until the information is read out to be supplied to the inverting amplifier 15. With this operation, the positive voltages respectively stored in the sample-hold circuits 12-C1 to 12-C4 which are applied in a sequence via the switching circuits 14-C1 to 14-C4 to the input of the inverting amplifier 15 are inverted to negative voltages (signal 15a) as shown in FIG. 4B. The output signal 15a of the inverting amplifier 15 is applied to the input of the integrator 17 only when a high level signal 20a is applied to the control terminal of the switching circuit 16 from the second flip-flop 20 as described hereinbefore. With this arrangement, the integrator 17 integrates the positive voltage 16b firstly and the negative voltage 15a secondly. Since the negative voltage changes in accordance with the intensity of combustion knock as described hereinabove, the slope of the integration of the negative voltage varies to change the ignition timing. Accordingly, the spark plugs 26 are sequentially energized by high voltages applied from the distributor 32 with respective ignition timings determined by the feedback operation for each cylinder of the engine.

It will be understood from the foregoing that although only a single knock sensor 1 is employed, the intensity of the combustion knock of each cylinder is correctly and discretely detected and therefore, the ignition timing of each cylinder is respectively determined in accordance with the descretely detected intensity or magnitude of the combustion knock. The advance and retard of each ignition timing of the corresponding cylinder is, therefore, adjusted in such a manner that the occurrence of an undesirable combustion knock is prevented by retarding the ignition timing while excessive retard of the ignition timing is simultaneously prevented. Of course, the ignition timing is not advanced more than the previously mentioned most advanced ignition timing.

As will be seen in FIG. 4A, the intensity of the combustion knock of the first cylinder C1 is at the high knock level (see also FIG. 6), exceeding the first reference knock level A. This means that the ignition timing of the first cylinder C1 has to be retarded to some extent to reduce the intensity of the combustion knock. The intensity of the combustion knock of the third cylinder C3 whose ignition follows the first cylinder C1 is in the medium knock level and the ignition timing of the third cylinder C3 has to be retarded in the same manner. On the other hand, the intensity of the combustion knock in the fourth cylinder C4 is lower than the low knock level, viz. no combustion knock occurs, and therefore, the ignition timing of the fourth cylinder C4 has to be advanced so that the intensity of the combustion knock is kept within the low knock level. The intensity of the combustion knock in the second cylinder C2 whose ignition follows the fourth cylinder C4, is within the low knock level, and therefore, there is no need to compensate for the ignition timing. In this case, the ignition timing is neither advanced nor retarded.

The compensation or correction, i.e. advance or retard, of the ignition timing of each cylinder is performed in the following ignition of the same cylinder. When the ignition timing is excessively advanced by the compensation, and the combustion knock intensity is again above the low knock level, the compensation continuously takes place until the intensity of the combustion knock is maintained in the low knock level, i.e. the range defined by the second and third reference voltages B and C.

It will be understood that if the knock sensor 1 shown in FIG. 1 is substituted by respective pressure sensors or pick-ups disposed on each cylinder to measure the pressure of shock-waves caused by knock in each cylinder, the intensity of the combustion knock in each cylinder is more precisely detected. When such a series of pressure sensors is employed to detect the intensity of the combustion knock in each cylinder, the cylinder detector 28 is unnecessary.

Furthermore, the level detector 7 which actually includes a plurality of comparators 48 to 52 and an adder 54 as shown in FIG. 5, may be substituted with a differential amplifier. When a differential amplifier is used as the level detector 7, the differential amplifier produces an output signal indicative of the difference between the voltages of the output signals 4a and 6a of the peak level detector 4 and the function generator 6.

The above described construction, i.e. the usage of a differentiator as the level detector 7 shown in FIG. 1, defines a second embodiment of the ignition timing control system for an internal combustion engine according to the present invention, and the operation of this second embodiment will be described hereinbelow. Since the second embodiment has the same construction as the first embodiment shown in FIG. 1 except that the level detector 7 consists of a differential amplifier, the second embodiment will be described taken in conjunction with FIG. 1.

In the second embodiment the voltage of the signal 6a produced in the function generator 6 is set to correspond to a suitable point in the low knock level, i.e. the range defined by the second and third reference voltages B and C shown in FIG. 5 so that the output voltage of the differential amplifier is proportion to the magnitude or intensity of the combustion knock when the intensity of combustion knock is above the low knock level. Accordingly, when the intensity of combustion knock equals the low knock level indicated by the signal 6a, the output voltage of the differentiator is zero, while the output voltage is of a negative value if no combustion knock occurs.

The output signal 7a of the differential amplifier 7 (level detector) is fed to the first input 8-1 of the subtractor 8 which receives a signal indicative of the preceeding ignition timing of the same cylinder at the second input 8-2. Therefore, the subtractor 8 produces an output signal 8a indicative of the difference between the input signals 7a and one of the signals 12-C1a to 12-C4a in the same manner as in the first embodiment. The function of the other circuits in the second embodiment is the same as in the first embodiment and therefore the description thereof is not repeated.

It will be understood that in the second embodiment the ignition timing is adjusted in proportion to the intensity of the combustion knock so that more accurate control of the ignition timing with respect to the intensity of the combustion knock is performed.

Figure 7:
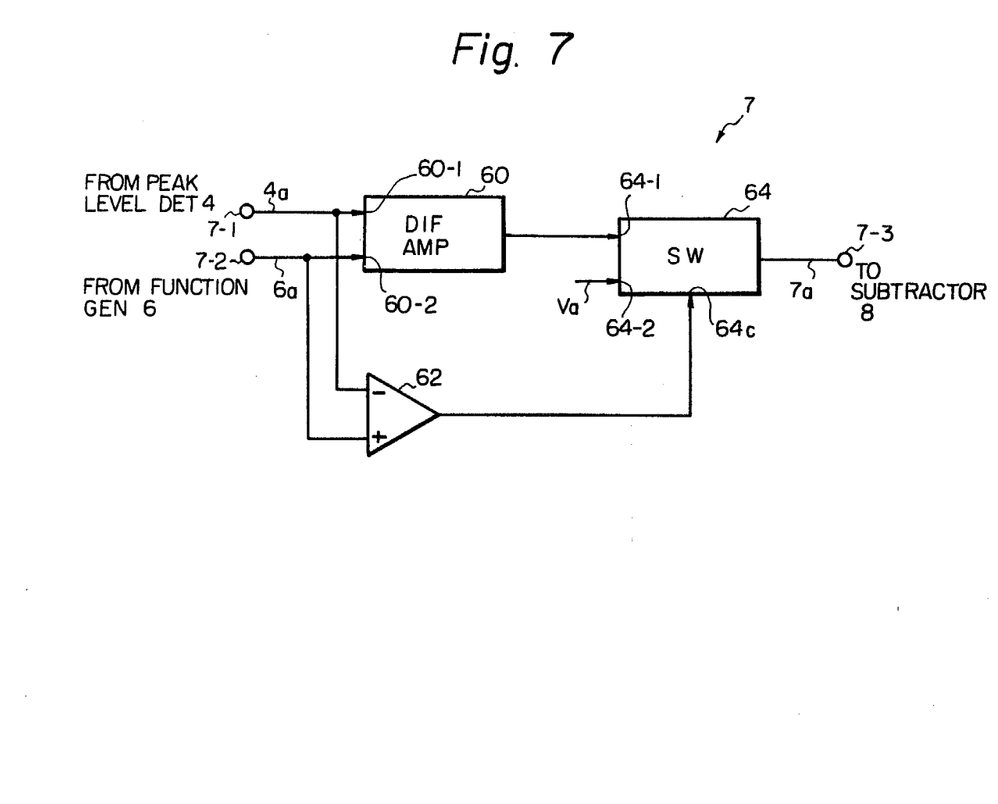
FIG. 7 shows a detailed circuit diagram of the level detector which is used in the third embodiment.

Reference is now made to FIG. 7 which shows a block diagram form of a third embodiment of the ignition timing control system for an internal combustion engine according to the present invention. The third embodiment has the same structure as the previously described first and second embodiments except that the level detector 7 is constituted by a differential amplifier 60, a comparator 62 and a switching circuit 64. Therefore, only the circuit diagram of the level detector 7 is shown in FIG. 7 for simplicity. The output of the peak level detector 4 shown in FIG. 1 is connected via first input terminal 7-1 to a first input 60-1 of the differential amplifier 60 and to an inverting input ($-$) of the comparator 62, while the output of the function generator 6 also shown in FIG. 1 is connected via a second input terminal 7-2 to the second input 60-2 of the differential amplifier 60 and to a noninverting input ($-$) of the comparator 62. The output of the differential amplifier 60 is connected to a first input 64-1 of the switching circuit 64 the output of which is connected to the first input 8-1 of the subtractor 8. The switching circuit 64 has a second input 64-2 to receive a predetermined voltage Va and a control terminal 64c connected to the output of the comparator 62 to receive a control (gate) signal.

The third embodiment operates as follows, where the operation will be described in connection with the level detector 7 since the operation of the remaining circuits is the same as the first and second embodiments. The differential amplifier 60 produces an output signal indicative of the difference between voltages of the signal 4a and 6a in the same manner as in the second embodiment. However, the output signal of the differential amplifier 60 is not directly transmitted to the subtractor 8 but via the swtiching circuit 64 which is controlled by the output signal of the comparator 62. The comparator 62 produces a high level output signal when the voltage of the signal 4a, which indicates the intensity of combustion knock, is below the voltage of the signal 6a which indicates a reference intensity (low level) of combustion knock. The switching circuit 64 is arranged to transmit the output signal of the differential amplifier 60 in receipt of a low level signal from the comparator 62, and transmit the predetermined voltage Va in receipt of a high level signal from the same. This predetermined voltage Va applied to the second input 64-2 of the switching circuit 64 is preset to correspond to an advance angle of a predetermined small value. In other words, the predetermined voltage Va is of a negative value of a relatively small degree.

With this provision, although the output voltage of the differential amplifier 60 is transmitted to the subtractor 8 when the intensity of combustion knock is over the low knock level defined by the reference signal 6a, the negative predetermined voltage Va is transmitted to the subtractor 8 in place of the output signal of the differential amplifier 60 when the voltage of the signal 4a is below the voltage of the signal 6a. Namely, when the differential amplifier 60 produces a negative output signal, this negative voltage is not supplied to the subtractor 8 but the predetermined negative voltage Va is. Since a negative voltage applied to the first input 8-1 of the subtractor 8 causes the following circuits to advance the ignition timing, the ignition timing is advanced by a small value defined by the predetermined negative voltage Va.

From the foregoing, it will be apparent that the retard of the ignition timing is made in proportion to the degree of the combustion knock and the advance of the ignition timing is made by a predetermined small value irrespectively of the detected intensity of combustion knock. Therefore, when combustion knock occurs, the ignition timing is retarded promptly as much as an angle corresponding to the intensity of the detected combustion knock, and on the other hand the ignition timing is advanced with only a small angle when it is necessary to advance the ignition timing. In this third embodiment, since the ignition timing is advanced with a predetermined small value, an undesirable hunting phenomenon in the closed loop circuit of the ignition timing control system is prevented.

According to experiments, the threshold angle of ignition timing of the trace combustion knock has variation as much as 7 to 8 degrees in terms of the rotational angle of the crankshaft of the engine, when the engine is operated at 1600 rpm. When the spark plugs of the cylinders of the engine are energized with the equal ignition timing in such a manner that the occurrence of undesirable combustion knock in any of the cylinders is prevented, namely the ignition timing of all cylinders are uniformly retarded to an extent in the conventional way, the output engine (shaft) torque is 11.9 Kg.m.

On the other hand, when the ignition timing of each cylinder is discretely determined in accordance with the intensity of knock in each cylinder utilizing the ignition timing control system according to the present invention, the engine torque is 12.6 Kg.m. This means that the engine torque under the uniform ignition timing is 5.5 percent lower than the engine torque under the discretely determined ignition timing and thus the experiments prove that the engine output increases if the ignition timing of each cylinder is respectively determined in accordance with the respective intensity of the combustion knock in each cylinder.

By the experiments, it became also apparent that the rate of the decrease of the engine torque due to the retarded ignition timing has a tendency to become high as the compression ratio of the engine rises. From the result of the above experiments, it will be seen that the ignition timing control system according to the present invention provides an internal combustion engine with high efficiency.

From the foregoing, it will be readily understood that the ignition timing of each cylinder is optimally adjusted so as to obtain the maximum engine output, while the fuel consumption characteristic is improved. For these reasons the method of ignition in each cylinder by the ignition timing control system according to the present invention increases the possibility of making compression ratio high and therefore, it is expected that engine output increases by setting the compression ratio high and further by other mechanisms such as a supercharger when the ignition timing of each cylinder is controlled in accordance with the intensity of the combustion knock in each cylinder.

It will be understood for those skilled in the art that many modifications and variations of the ignition timing control system may be made without departing from the spirit of the present invention.

What is claimed is:

1. An ignition timing control system for an internal combustion engine, comprising:
   (a) first means for producing a function of respective intensities of combustion knock in each cylinder of said engine;
   (b) second means for respectively storing said function corresponding to each cylinder in a sequence; and
   (c) third means for determining respective ignition timings of each cylinder in accordance with the respectively stored functions by modifying the basic ignition timing determined by an advance mechanism,
   wherein said first means comprises:
   a knock sensor for producing an output signal indicative of the intensity of an impact of combustion knock in the cylinders of said engine,
   a band-pass filter responsive to said output signal of said knock sensor for transmitting only frequencies of combustion knock,
   a peak level detector for producing an output representing the peak level of the intensity of combustion knock in said cylinder,
   means for generating a reference signal which is variable in accordance with the engine rotational speed,
   a level detector for comparing said output signal of said peak level detector with said reference signal, and
   a subtractor for subtracting said level detector signal from the function stored by said second means to produce said function of respective intensities of combustion knock in each cylinder of said engine.

2. An ignition timing control system as claimed in claim 1, wherein said first means comprises:
   means for producing a first signal in synchronization with ignition timing;
   a series of switching circuits arranged to transmit signals indicative of the respective functions stored in said second means to said subtractor in a sequence;
   means for producing a second timing signal in synchronization with ignition timing, said second timing control occurring after said first timing signal; and
   a sample-hold circuit for sampling the output of said subtractor in response to said second timing signal.

3. An ignition timing control system as claimed in claim 2, wherein said level detector comprises:
   (a) a plurality of comparators responsive to the output signal of said peak level detector and reference voltages which are stepwise arranged with respect to the voltage of said reference signal fed from said reference signal generating means; and
   (b) an adder responsive to the output signals of said comparators.

4. An ignition timing control system as claimed in claim 2, wherein said level detector comprises: a differential amplifier responsive to the output signal of said peak level detector and said reference signal from said reference signal generating means.

5. An ignition timing control system as claimed in claim 2, wherein said level detector comprises:
   (a) a differential amplifier responsive to the output signal of said peak level detector and said reference signal from said generating means;
   (b) a comparator responsive to the output signal of said peak level detector and said reference signal; and
   (c) a switching circuit responsive to the output signal of said comparator for selectively transmitting the output signal of said differential amplifier and a predetermined voltage.

6. An ignition timing control system as claimed in claim 1, wherein said second means comprises:
   (a) means for producing data indicative of a specific cylinder in which ignition takes place;
   (b) means for producing a third timing signal in synchronization with ignition timing;
   (c) gate means responsive to said data to respectively transmit said third timing signal;
   (d) a series of sample-hold circuits the number of which corresponds to the number of the cylinders of said engine, said sample-hold circuits being controlled by the output signal of said gate means to be alternately enabled to sample and hold the output signal of said first means in a sequence in synchronization with the ignition timing of respective cylinders; and
   (e) a series of switching circuits responsive to said data for respectively transmitting the output signals of said sample-hold circuits in a sequence, the order of said transition being arranged to conform to the order of ignition.

7. An ignition timing control system as claimed in claim 1, wherein said means for producing said data comprises a shift register responsive to the ignition timing.

8. An ignition timing control system as claimed in claim 1, wherein said third means comprises:
   (a) means for producing first and second signals in accordance with the rotational angle of the shaft of the distributor;
   (b) a switching circuit responsive to said second signal for selectively transmitting the output signal of said second means and a predetermined voltage of an opposite polarity with respect to the output signal of said second means;
   (c) an integrator responsive to the output signal of said switching circuit to integrate the same, said integrator initiating integration upon presence of said first signal;
   (d) a comparator responsive to the output signal of said integrator for producing an output signal when the voltage of the integrated signal equals a predetermined value;
   (e) a monostable multivibrator responsive to the output signal of said comparator to produce a pulse signal; and
   (f) an ignition driving circuit responsive to said pulse signal for energizing the primary winding of the ignition coil.

9. An ignition timing control system as claimed in claim 8, wherein said means for producing said first and second signals comprises:
   (a) a rotary member arranged to rotate in synchronization with the shaft of the distributor;
   (b) a plurality of projections arranged on the periphery of said rotary member, the number of said projections being equal to the number of the cylinders of said engine;
   (c) a disk arranged to rotate with respect to said rotary member in accordance with the vacuum prevailing in the intake manifold;
   (d) first and second pick-ups fixedly mounted on said disk, said first and second pick-ups being arranged with a predetermined circular pitch with respect to the axis of said rotary member and adjacent to the track of said projections; and
   (e) first and second flip-flops respectively responsive to the output signals of said first and second pick-ups to be set, said first and second flip-flops being reset by the output signal of said comparator.

10. An ignition timing control system as claimed in claim 2, further comprising a limiter circuit for limiting the output voltage of said sample-hold circuit within a predetermined value.

11. An ignition timing control system as claimed in claim 10, wherein said limiting circuit comprises:
    (a) a comparator responsive to the output signal of said sample-hold circuit and a reference signal of a constant voltage; and
    (b) a switching circuit responsive to the output signal of said comparator for selectively transmitting the output signal of said sample-hold circuit and said reference signal.

12. An ignition timing control system as claimed in claim 1, wherein said reference signal generating means comprises:
    (a) an engine rotational speed sensor; and
    (b) a function generator responsive to the output signal of said engine rotational speed sensor for producing said reference signal as a function of the engine rotational speed.

13. An ignition timing control system as claimed in claim 1, wherein said knock sensor comprises: a vibration sensor.

14. An ignition timing control system as claimed in claim 1, wherein said knock sensor comprises an acoustic sensor.

15. An ignition timing control system for an internal combustion engine, comprising:
    means for producing a function signal of the intensity of combustion knock in each cylinder of said engine;
    means for storing said function signal corresponding to each cylinder in a sequence; and
    means for determining the ignition timing of each cylinder in accordance with the respectively stored function signals by modifying the basic ignition timing determined by an advance mechanism,
    wherein said producing means comprises means for generating a reference signal variable with the engine speed of said engine, a peak level detector for producing a peak level signal indicative of the peak level of the intensity of combustion knock in each cylinder, a level detector for comparing said peak level signal with said reference signal to produce a level detection signal, and a subtractor for subtracting said level detection signal from said function signal stored in said storing means to produce said function signal to be produced from said first means.

16. A method for controlling the ignition timing of an internal combustion engine, comprising:
- a first step for producing a function signal of the intensity of combustion knock in each cylinder of said engine;
- a second step for storing said function signal corresponding to each cylinder in a sequence; and
- a third step for determining the ignition timing of each cylinder in accordance with the respectively stored function signals by modifying the basic ignition timing determined by an advance mechanism, wherein said first step comprises following each of the steps of: generating a reference signal variable with the engine speed of said engine; detecting a peak level of the intensity of combustion knock in each cylinder; producing a level detection signal by comparing said peak level detection signal with said reference signal; and subtracting said level detection signal from said stored function signal to produce said function signal.

* * * * *